Dec. 21, 1926.
S. W. WARNER
1,611,796
SUSPENSION FOR ELECTRIC MOTORS
Filed Feb. 23, 1923
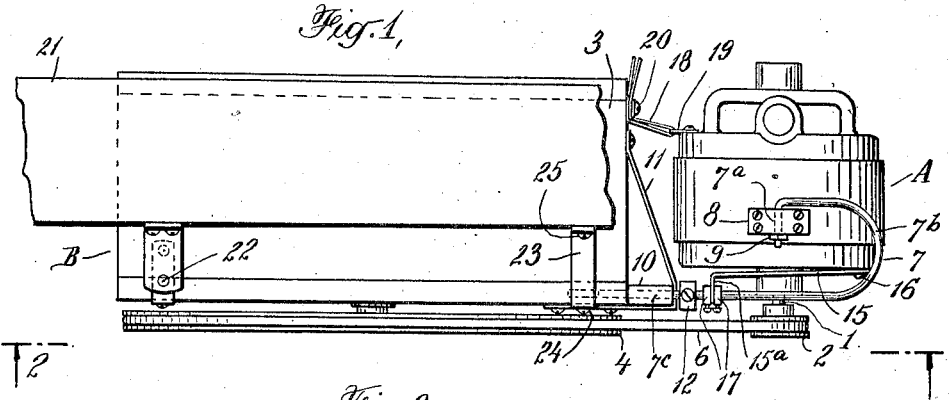
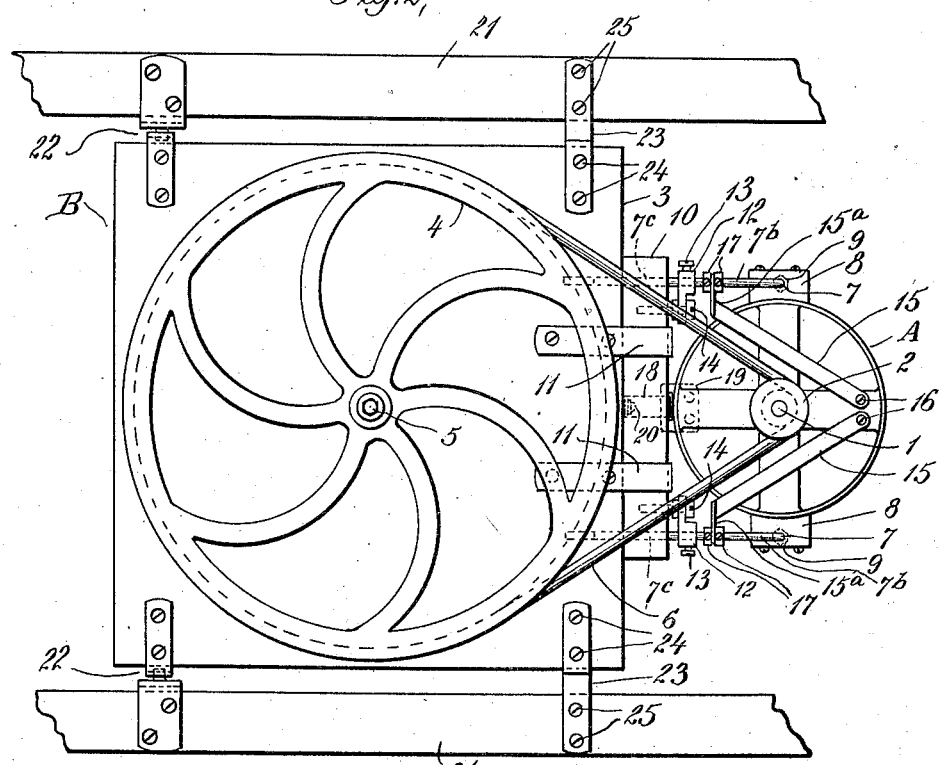
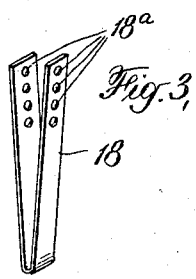
Inventor
Sterling W. Warner
By his Attorney Patented Dec. 21, 1926.

1,611,796

UNITED STATES PATENT OFFICE.

STERLING W. WARNER, OF CRANFORD, NEW JERSEY, ASSIGNOR TO THE AEOLIAN COMPANY, A CORPORATION OF CONNECTICUT.

SUSPENSION FOR ELECTRIC MOTORS.

Application filed February 23, 1923. Serial No. 620,859.

My present invention relates to an improved anti-noise suspension for electric motors, especially motors whose operative position requires their drive shaft to be vertical. The suspension is useful in a variety of apparatus including especially grand player pianos as distinguished from uprights, due to the fact that in the former the shallow horizontal case of the piano is best adapted to house and conceal the electric motor driven exhauster when the motor and driven shafts are vertical as distinguished from horizontal. Other features and advantages of my present improvements will appear from the following description in connection with the drawings.

The drawings show a preferred embodiment of my present improvements in electric motor suspension means, Fig. 1 being an elevation of an electric motor driven exhauster embodying my suspension wherein the motor shaft is located vertically as in a grand piano; Fig. 2 is a plan view on the line 2—2 in Fig. 1 looking upwardly; and Figs. 3, 4 and 5 are detached views of parts designated by the same numerals in Figs. 1 and 2.

A is the electric motor having drive shaft 1 and drive pulley 2 on said shaft. The exhauster B has a casing 3 containing the pumpers and other mechanism appertaining to an exhauster or wind tension producing device, not necessary to be shown. 4 is a pulley on the shaft 5 driven by the belt 6 from the motor pulley 2 for driving the exhauster.

The motor is suspended on a pair of bent spring metal rods 7—7, each comprising a short vertical portion 7ª depending from the upper limb of a U-shaped portion 7ᵇ whose lower limb may have a horizontal prolongation or extension 7ᶜ. Said vertical portion 7ª of the rods extend downwardly through holes in lugs 8 screwed to opposite sides of the motor. Nuts 9 on the screw-threaded extremities of said vertical portion 7ª below the lugs 8 complete the attachment of the motor to the upper limbs of the U-members.

The prolongations 7ᶜ are adjustably received through holes in a bar 10 secured by metal straps 11 across the end of the exhauster casing adjacent its bottom, it being remembered that said casing is located flatwise in a grand piano as shown in the elevational view of Fig. 1.

Means is provided for adjusting the said prolongations 7ᶜ from the lower limbs of the U-shaped spring members longitudinally in the holes through the aforesaid bar 10, the purpose being to properly distance the motor from the exhauster for proper tightness of the belt 6, etc. Said adjusting means comprises a forked lug 12 (Fig. 4) secured by a set screw 13 on each prolongation 7ᶜ. The fork of each lug straddles the neck of a screw 14 between the head of said screw and a fixed collar 14ª thereon, said screws being tapped into holes in the bar 10. It will be apparent that by adjusting the screws 14, the distance between the electric motor and the driven apparatus can be delicately adjusted and therefore the degree of tightness of the belt 6 can be correspondingly adjusted.

15—15 are a pair of metal strips pivoted or screw-connected at 16 to the lower end of the motor near that part of its periphery which is furthest away from the driven apparatus. These strips 15 thence diverge towards the driven apparatus where their ends 15ª are bent as shown in Figs. 1 and 2 and are perforated each with a hole to receive the lower limbs of the U-shaped members through them. Each of said ends 15ª is anchored between two collars 17—17 secured by set screws on said lower limbs.

The aforesaid strips 15—15 effectually check lateral vibration of the motor in a plane parallel with the adjacent end of the exhauster casing. Compare Fig. 1.

They also check up and down vibration of the U-shaped members 7 (compare Fig. 2).

18 is a strap of preferably leather or other flexible material (compare detail view Fig. 3 with Figs. 1 and 2) passed through a loop or slotted tab 19 on the upper end of the motor next the exhauster, with the ends of said strap folded on top of each other and provided with a longitudinal series of registering adjustment holes 18ª (Fig. 3) adapted to receive a screw 20 tapped into the end of the exhauster casing, as best shown in Fig. 1.

The adjustment of the strap should be such that the motor shaft is substantially vertical when the motor is belted up and driving the exhauster, said strap then acting as a tie for the upper end of the motor so that the spring member 7, by means of the screws 14, can be adjusted to have the requisite tension in a direction away from the exhauster to resist the contrary pull of the belt and incidentally check vibrations of the motor tending to tilt its shaft in a vertical plane to and away from the exhauster.

The described suspension means is very effective in silencing the hum of an electric motor, including an alternating current motor, and at the same time provides an effective working support for said motor with shaft in a vertical position, and also provides all necessary adjustments for said motor relatively to the driven apparatus.

21—21 are a pair of spaced apart wooden ribs forming part of or being attached to the frame of the grand piano. The aforesaid electric motor and exhauster constitute a unitary structure pivotally supported at its left-hand end in Figs. 1 and 2 on said ribs 21, whereby, for convenience for making repairs, the right-hand or electric motor end of said unit can be swung downwardly between said ribs 21 into a position wherein the motor rests on the floor. The pivotal support of said unit may be accomplished in any desired or preferred way, as by the trunnion means 22.

23—23 are right angled brackets screwed at 24 to the right-hand end of the exhauster casing and adapted to be secured by screws 25 to the underside of the piano frame members 21—21 when the motor-exhauster unit is in its "up" or operative position within the casing of the grand piano.

Changes and modifications can be made in the herein preferred embodiment of my improvements without departing from the essence thereof and which will still be within the spirit of my invention and within the spirit and meaning of the annexed claims and as such are intended to be covered thereby.

What I claim is:

1. Means for supporting an electric motor with its drive shaft substantially vertical, and with its pulley end downwards, comprising spring members supporting said motor by its sides and pressing it yieldingly away from the driven apparatus to which the pulley of the motor is connected by a belt; and means connecting the upper end of the motor to an extraneous support for steadying said motor against the pull of the driving belt.

2. Means for supporting an electric motor with its drive shaft substantially vertical, and with its pulley end downwards, comprising spring members supporting said motor by its sides and pressing it yieldingly away from the driven apparatus to which the pulley of the motor is connected by a belt; means connecting the upper end of the motor to an extraneous support for steadying said motor against the pull of the driving belt; and means for damping vibrations of said motor on said spring members in a vertical direction.

3. Means for supporting an electric motor with its drive shaft substantially vertical comprising U-shaped spring members located in vertical planes with the motor between them supported by its sides from the upper limbs of said spring members, the lower limbs of said members projecting towards the driven apparatus; means for supporting said members by their lower limbs so they are adjustable lengthwise relatively to their supports to tension said members against the pull of the belt of said motor; and means connecting said motor to an extraneous support for steadying it against the pull of said belt.

4. Means for supporting an electric motor with its drive shaft substantially vertical, comprising spring members supporting said motor by its sides and pressing it yieldingly away from the driven apparatus to which the motor is connected by a belt; and means connecting the motor to an extraneous support for steadying said motor against the pull of the driving belt.

5. Means for supporting an electric motor with its drive shaft substantially vertical and with its pulley end downwards, comprising U-shaped spring members located in vertical planes with the motor between them supported by its sides from the upper limbs of said spring members, the lower limbs of said members projecting towards the driven apparatus; means for supporting said members by their lower limbs so they are adjustable lengthwise relatively to their supports to tension said members against the pull of the belt on the pulley of said motor; means connecting said motor to an extraneous support for steadying it against the pull of said belt; and members connecting the lower limbs of said spring members with that portion of the lower end of said motor which is located away from the driven apparatus.

6. Means for supporting an electric motor with its drive shaft substantially vertical and with its pulley end downwards, comprising U-shaped spring members located in vertical planes with the motor between them supported by its sides from the upper limbs of said spring members, the lower limbs of said members projecting towards the driven apparatus; means for supporting said members by their lower limbs so they are adjustable lengthwise relatively to their supports to tension said members against the pull of the belt on the pulley of said motor; and members adjustable along the lower limbs of said spring members converging to a pivotal connection with the lower end of the motor.

7. Means for supporting an electric motor with its drive shaft substantially vertical, comprising U-shaped spring members located in vertical planes with the motor between them supported by its sides from the upper limbs of said spring members; means for supporting said members by their lower limbs; and means for damping vibrations of said motor on said spring members in a vertical direction.

8. Means for supporting an electric motor with its drive shaft substantially vertical, comprising U-shaped spring members located in vertical planes with the motor between them supported by its sides from the upper limbs of said spring members; means for supporting said members by their lower limbs to tension said members against the pull of the belt of said motor; means connecting said motor to an extraneous support for steadying it against the pull of said belt; and means for damping vibrations of said motor on said spring members in a vertical direction.

9. Means for supporting an electric motor with its drive shaft substantially vertical comprising spring members supporting said motor and pressing it yieldingly away from the driven apparatus to which the motor is connected by a belt; and means connecting said motor to an extraneous support for steadying the motor against the pull of the driving belt.

10. Means for supporting an electric motor with its drive shaft substantially vertical comprising spring members supporting said motor and pressing it yieldingly away from the driven apparatus to which the motor is connected by a belt; means connecting said motor to an extraneous support for steadying the motor against the pull of the driving belt; and means for damping vibrations of the motor on said spring members in a vertical direction.

Signed at New York in the county of New York and State of New York this 16th day of February A. D. 1923.

STERLING W. WARNER.